US008065353B2

(12) United States Patent
Eckhoff-Hornback et al.

(10) Patent No.: US 8,065,353 B2
(45) Date of Patent: Nov. 22, 2011

(54) CUSTOMER SEARCH UTILITY (75) Inventors: Wendy S. Eckhoff-Hornback, Stillwater, MN (US); Robert William Ash, Andover, MN (US); Terri Jo Peterson, Plymouth, MN (US); Joseph Herman Pletsch, Lino Lakes, MN (US); Patricia Ann Perry, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 379 days.

(21) Appl. No.: 12/346,529

(22) Filed: Dec. 30, 2008

(65) Prior Publication Data
US 2010/0169336 A1 Jul. 1, 2010

(51) Int. Cl.
G06F 17/30 (2006.01)
(52) U.S. Cl. ......... 707/949; 705/14.65; 705/16; 705/20; 705/22; 705/26.1; 705/27.2; 705/28
(58) Field of Classification Search .................. 707/948, 707/949; 705/14.65, 16, 20, 22, 26.1, 27.2, 705/28
See application file for complete search history.

(56) References Cited

U.S. PATENT DOCUMENTS

| | | | |
|---|---|---|---|
| 6,125,353 A | 9/2000 | Yagasaki | |
| 6,442,530 B1 | 8/2002 | Miller | |
| 6,507,279 B2 | 1/2003 | Loof | |
| 6,566,915 B1 * | 5/2003 | Krupnik et al. | 327/58 |
| 6,587,835 B1 | 7/2003 | Treyz et al. | |
| 6,820,076 B2 | 11/2004 | Bailey et al. | |
| 7,010,498 B1 | 3/2006 | Berstis | |
| 2003/0126026 A1 * | 7/2003 | Gronberg et al. | 705/26 |
| 2003/0195806 A1 * | 10/2003 | Willman et al. | 705/14 |
| 2004/0153368 A1 * | 8/2004 | Freishtat et al. | 705/26 |
| 2005/0096997 A1 * | 5/2005 | Jain et al. | 705/26 |
| 2005/0125386 A1 | 6/2005 | Diebold | |
| 2006/0136403 A1 | 6/2006 | Koo | |
| 2006/0190340 A1 | 8/2006 | Myskowski | |
| 2006/0243795 A1 * | 11/2006 | Sardano | 235/382 |
| 2007/0174085 A1 | 7/2007 | Koo et al. | |
| 2007/0174088 A1 | 7/2007 | Koo et al. | |
| 2007/0174089 A1 | 7/2007 | Koo et al. | |
| 2007/0174115 A1 * | 7/2007 | Chieu et al. | 705/14 |
| 2008/0120494 A1 * | 5/2008 | Marchand et al. | 712/225 |
| 2008/0140479 A1 * | 6/2008 | Mello et al. | 705/7 |

OTHER PUBLICATIONS

Shim et al., Journal of Retailing, 77 (2001), pp. 397-416.*

* cited by examiner

Primary Examiner — Cheyne Ly
(74) Attorney, Agent, or Firm — Nixon & Vanderhye P.C.

(57) ABSTRACT

A customer search terminal system may be configured to accept customer product searches and identify corresponding products and product information. A method for determining the efficacy of the customer search terminal may include receiving customer usage information including data related to customer usage of a customer search terminal and may also include receiving product sales information including data related to products sold at a point-of-sale terminal. The method may further include generating customer purchase behavior information by correlating the received customer search terminal usage information with the received product sales information when a product is sold at the point-of-sale terminal within a prescribed time period relative to a search for the product on the customer search terminal.

13 Claims, 6 Drawing Sheets

CUSTOMER SEARCH UTILITY

TECHNICAL FIELD

This disclosure relates to customer search terminals that accept customer product searches and identify and locate corresponding products and product information.

BACKGROUND

Modern data collection and communication techniques have contributed to the development of automated tracking systems that can monitor and display a vast inventory of items. Information that was once written onto paper and stored in filing cabinets is now entered into computer systems, scanned from barcode devices, and read from radio frequency identification (RFID) tags. The movement of products can be tracked efficiently, and important inventory-related metrics can be monitored and analyzed, such as the availability of an item from one location to the next, or the identification of whether the stock of an item is running low.

However, these automated inventory systems are usually not made available to customers who wish to locate and purchase items available in their local retail stores. Instead, these complex inventory systems are often restricted to store employees who are sometimes busy helping other customers or are otherwise busy performing store-related tasks. In larger retail store environments, this disconnect often causes frustration to customers who are unable to find the items they wish to purchase, and it sometimes results in the customers leaving the store without ever finding the item—even if the item is available and in stock.

Kiosks and other types of public terminals are used by some organizations to provide improved self-service options for their customers. Automated teller machines (ATMs), for example, can provide banking services to a customer after the bank has closed for the evening. ATMs perform many of the same functions of a local branch, but at a reduced operating cost to the bank, and often at more convenient locations than the local branches. Another example of a popular self-service option is a check-in kiosk at an airport terminal. These airport check-in kiosks allow travelers to find updates about flight delays, request seating upgrades, and print their own boarding passes, thus allowing busy travelers to bypass the long lines that are typical of check-in terminals staffed by airline employees.

SUMMARY

A customer search terminal system may be configured to accept customer product searches and identify corresponding products and product information. A method for determining the efficacy of the customer search terminal may include receiving customer usage information including data related to customer usage of a customer search terminal and may also include receiving product sales information including data related to products sold at a point-of-sale terminal. The method may further include generating customer purchase behavior information by correlating the received customer search terminal usage information with the received product sales information when a product is sold at the point-of-sale terminal within a prescribed time period relative to a search for the product on the customer search terminal.

In an illustrative implementation, the customer usage information may include search terms entered by a user and the corresponding product search results. The customer usage information may also include customer navigation history that includes customer inputs to the customer search terminal and information about the screens that are displayed on the customer search terminal during a customer search session. The customer usage information may also include timing information related to how long each of the screens are displayed.

The details of one or more implementations are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION OF ILLUSTRATIVE IMPLEMENTATIONS

Figure 1:
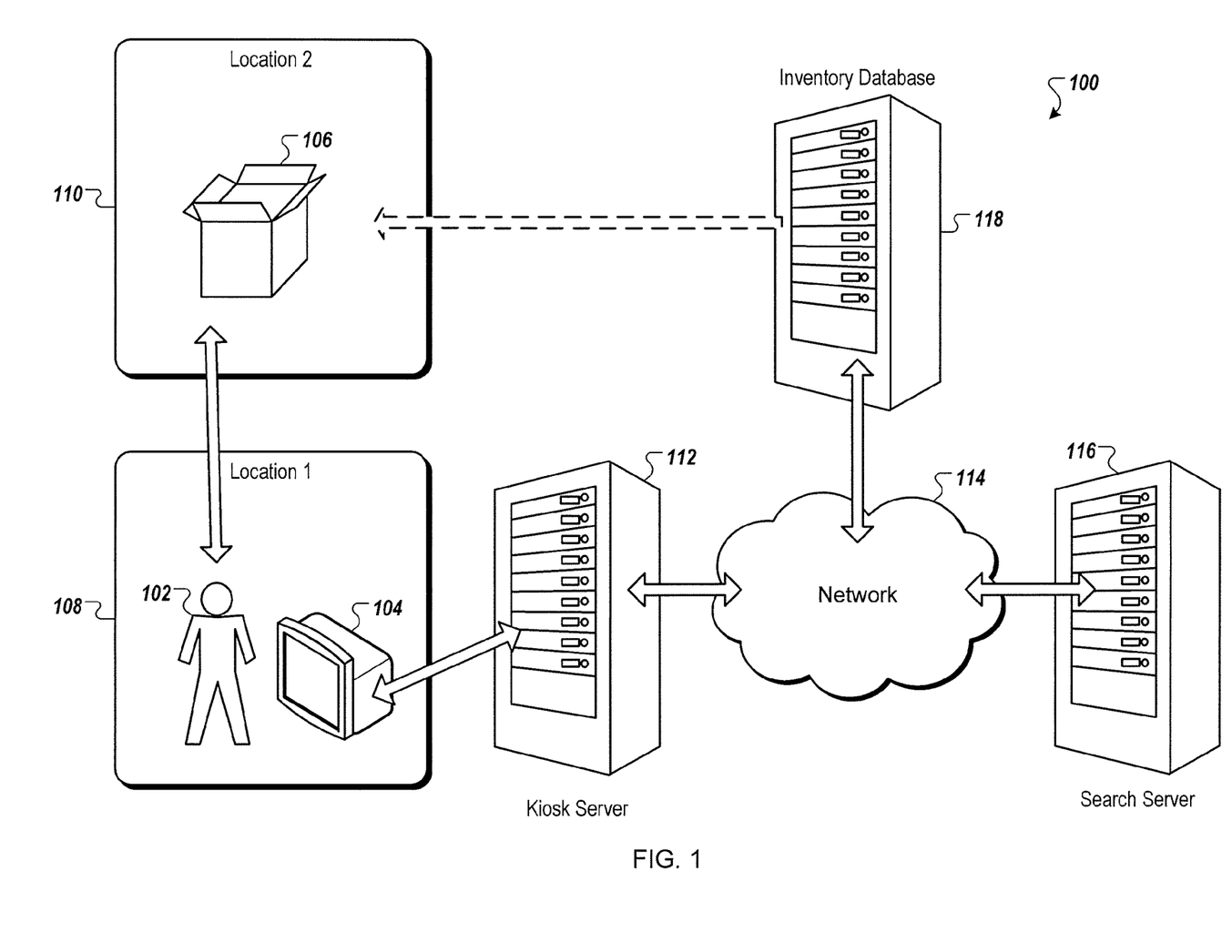
FIG. 1 is a block diagram of a customer search terminal system.

FIG. 1 shows an exemplary system 100 that can be used by a customer to identify and find a product for purchase. A typical user 102 of the system 100 is a retail customer who wishes to find a specific product or a type of product in a local store. The customer 102 is located at a first location 108 in the store. Also present at the first location 108 is a customer search terminal 104, which is accessible and operable by the customer.

The first location 108 is typically a high-traffic location in a retail store, but it may also be any other location where a customer search terminal 104 application may be beneficial. For example, the first location 108 may be located just outside a retail store for customers who want to check the availability of an item without having to enter the store. A customer search terminal 104 located outside a retail store would allow customers to search for products when the store is closed, for example during a holiday weekend or at a time that is outside the store's normal business hours. The first location 108 may also be located near a customer service desk within the store, which would allow customers to bypass the customer service desk in the event of a long line. In certain implementations, there may be several customer search terminals 104 located throughout a particular store.

Customer search terminals 104 may be physically configured in any number of different ways. For example, in one implementation, a customer search terminal 104 may be configured as a standalone customer kiosk, which may be mounted on a wall or on a beam in a store. Such a standalone kiosk may alternatively be mounted on, within, above, or near a product sales rack. Throughout this disclosure, the example configuration of a standalone customer kiosk will be used to further describe the details of the search system 100. However, the customer search terminal 104 may also be configured in a different manner. For example, in certain implementations, the customer search terminal 104 may be integrated into a handheld portable device that the user 102 may check out from the store. The user would then be able to carry the search terminal 104 anywhere in the store to facilitate user mobility and increased ease of shopping. In other implementations, the customer search functionality may be provided for use, for example, on a customer's own cellular phone or other mobile device.

In some implementations, the customer kiosk 104 may also include other integrated devices, such as a telephone handset that may serve as a hotline to guest services or the store's customer service department. A telephone handset may also be used to connect the customer to another store. Alternatively, or in addition, the customer kiosk 104 may include an integrated barcode reader that may be used to scan and identify products or coupons, or the like. A product barcode may be used, for example, to identify the price of an item, to allow the user to search for similar items, or to allow the user to search for the same item in a different size or color. In other implementations, a customer may scan a barcode on a printed coupon, and the customer kiosk 104 may show the customer where the discounted item is located in the store, or may provide the customer with other information about the product, such as related products and promotional purchasing options associated with those related products.

In some implementations, the customer kiosk 104 may include a magnetic stripe reader to identify information about the user of the system. In this particular implementation, for example, a user may swipe his or her credit card, a customer loyalty card, or a flexible spending account (FSA) card to identify the user to the system. In turn, the system may provide a more personalized user interface that is tailored to that particular user. Similarly, specific user information may allow the system to offer personalized coupons or promotions to a highly-valued shopper. In other implementations, the magnetic stripe reader may be configured to read a customer gift card, for example, to show the balance remaining on the card.

The customer kiosk 104 may also include printing functionality. In implementations where the customer kiosk 104 includes a printer or other type of printing functionality, the user may be allowed to print product lists and/or locations (including maps to the product locations), in-store coupons, related promotional information, registry items, or the like. The printing functionality may also allow a user to print a receipt or an item pick-up ticket. In other implementations, the kiosk 104 may be configured to send the product information and other printed data described above to a customer's mobile device via text message, e-mail, or other similar communication protocol.

One of the primary functions of the customer kiosk 104 is to locate items 106 so that a user can find and purchase the items she came to the store to buy. To accomplish this function, the user 102 can operate and interact with a customer kiosk 104 in any number of acceptable ways, as will be further described below. The customer kiosk 104 may communicate with a kiosk server 112, which may in turn communicate with a search server 116 to identify an item based on the customer's search criteria. Communication between the search server 116 and the kiosk server 112 can be over a shared network 114 such as a local area network (LAN), a wide area network (WAN), or the Internet, for example. In some implementations, the kiosk server 112 can also perform the functions of the search server 116.

The kiosk server can also query the availability and location of an item 106 in an inventory database 118. Communication between the inventory database 118 and the kiosk server 112 can be over a shared network 114 such as a LAN, a WAN, or the Internet. The customer kiosk 104 can then display the location 110 of the inventory 106, and the user 102 can go to the location 110 to find the inventory 106.

The user 102 and the customer kiosk 104 may be in the same or a different physical location 110 as the item 106 that the user is attempting to find. For example, the desired product may be in the same store as the customer 102 and the customer kiosk 104—possibly just a few feet or an aisle away. In other situations, the item may be located in the same store, but may be in a different department of the store. As another example, the desired product may be located in a nearby store that is owned by the same company. In this example, the customer 102 may use a customer kiosk 104 to search for an over-the-counter vitamin supplement. The store may be out of stock of that particular supplement, but another store within driving distance may have the supplement in stock. In this instance, the kiosk can provide a map and driving directions from the user's current location 108 to the nearby store's location 110.

Alternatively, the product 106 may not be available at any nearby in-store locations, but may be available for purchase from an online retail environment, such as the company's retail website. In this situation, the customer kiosk 104 may be configured to allow a user to place an order via the website.

The customer kiosk 104 may optionally be configured to allow a user 102 to choose whether she wants to search for in-store items, local items (meaning in-store items or items that are available locally in a nearby store), online items, or any combination thereof. Depending on the user's preferences, the customer kiosk 104 may return only the desired subset of available products that the user has specified.

Figure 2:
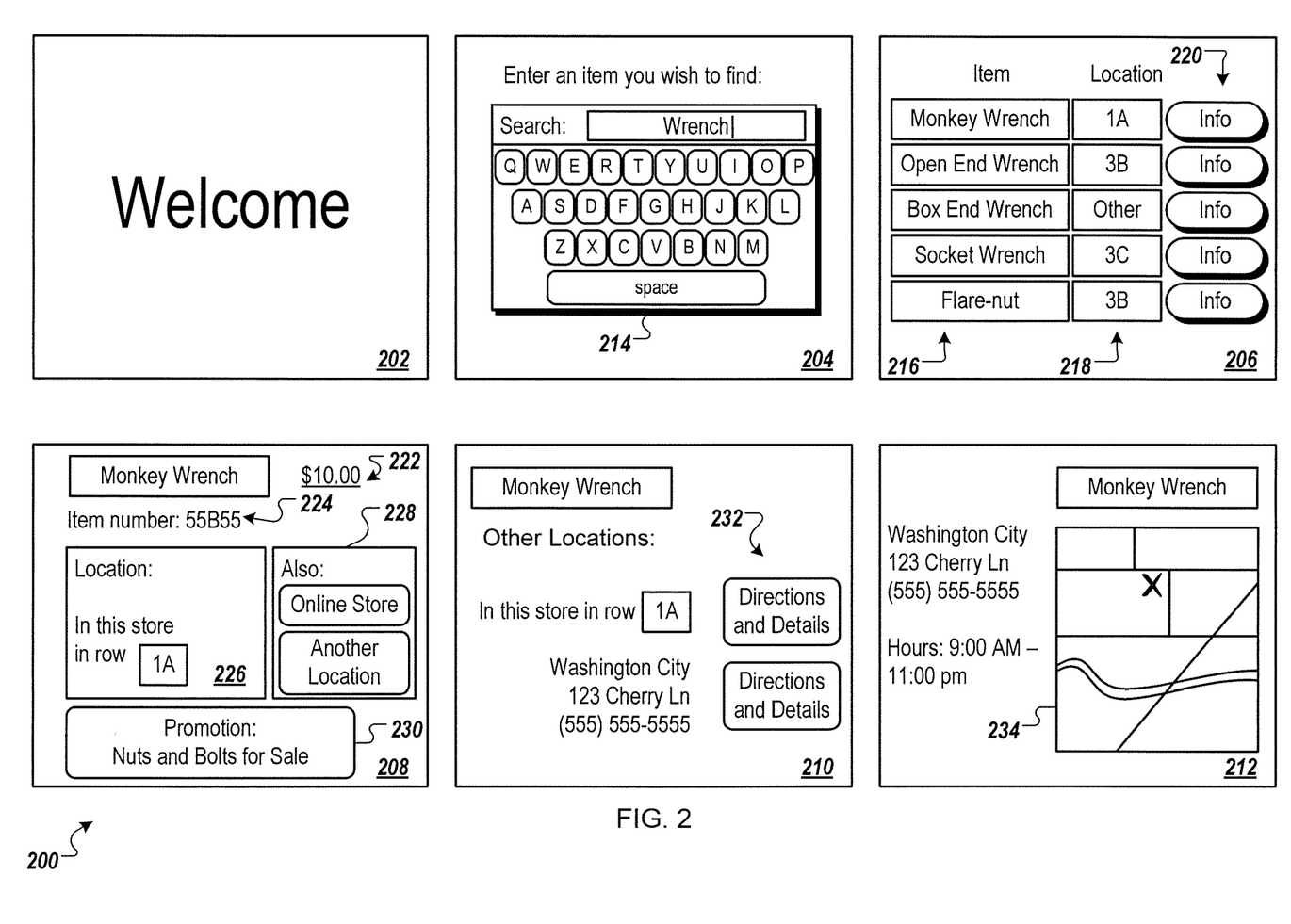
FIG. 2 is a set of illustrative user interface screens of a customer search terminal system.

FIG. 2 shows several illustrative display and input screens 200 that demonstrate an example customer usage scenario where a customer performs a customer kiosk search for a desired product—in this particular example, a monkey wrench. The display screens 200 are configured to help walk a user through the product search and selection process. These screens 200 may be displayed to a user, for example, via a video monitor integrated into an in-store customer kiosk.

An example start screen 202 shows a customer greeting that signifies to potential users that the customer kiosk is currently idle and is ready for use. In some implementations the display screen 202 can show a greeting, marketing or promotional information, local news, or the local weather forecast. This screen 202 is displayed until a user indicates that he or she is ready to use the system. The example screens are shown with an English language display, but in certain implementations, users may be allowed to select an appropriate language, and the screens will then display information and text in the selected language. Similarly, by changing the language of the displayed text, the search functionality may also be changed to search for items based on the language selected by the user.

In certain implementations, the start screen 202 may ask a user to enter personal information so that the user interface of the customer kiosk may be tailored to the customer's preferences. For example, the display screen 202 may include an entry form for a customer login or a loyalty card membership number. In other embodiments, the customer kiosk may include a barcode scanner or a magnetic reader such that a user may swipe a customer rewards card to identify herself to the system.

In implementations that recognize individual users, the system may provide a personalized user interface. For example, the system may recognize and reflect a customer's status or eligibility for certain discounts such as non-profit or small business discounts, tax exempt qualification, very important person (VIP) status, or the like. As another example, if the individual user has a flexible spending account (FSA), the system may identify or suggest certain products that are eligible for FSA spending, and may identify any related spending codes that may be applicable.

Alternatively, or in addition to the entry of a user's personal information, the display screen 202 may ask a user to specify just her personal preferences for the breadth a particular product search. For example, the user may choose to be shown only in-store items or only local items, or may specify that only generic product alternatives should be displayed in response to a particular product search.

In any of these implementations, a user may also be allowed enter the system as an anonymous user without entering any personalized information into the system. Anonymous users may proceed with a product search as described below, but without any customization or personalization of the user interface.

To begin a product search from an idle start screen 202, the user may simply touch the display screen 202 to advance to the next screen. In other implementations, the user may touch or click on a button, speak a command such as "Begin Search," or otherwise identify to the system that the user is ready to proceed with a product search.

When the user signifies that she is ready to proceed, a search input screen 204 may be displayed. An example search input screen 204 shows a screen designed to collect user input, and in particular search terms related to the product that the user wishes to find. In various implementations, search terms can be entered via an onscreen keyboard 214, voice recognition, a standard computer keyboard, or any other appropriate input mechanism. Information that can be entered at this search screen 204 may include, for example, product keywords, product categories (e.g., "tools" or "gifts for him"), prices, brand names, or store department keywords. The search screen 204 may also allow search inputs based on product or promotional identifiers included in store circulars, weekly advertisements, or other promotional materials distributed by the store. In certain implementations, the search input screen 204 may optionally include auto-complete functionality to help speed the input of a store's more popular search terms. For example, after the user has entered the letters "WR," the auto-complete may suggest final search terms of "Wreath" or "Wrench" and allow the user to select the appropriate search term rather than manually inputting the rest of the search term.

In other implementations, the input search may be in the form of a hierarchical selection process. For example, the user may start by selecting a top-level department such as "Toys" from the search screen. In turn, the system might display any number of sub-categories of toys such as "Action Figures," "Video Games," "Board Games," or the like. The user may continue upon this search process, narrowing the searches until the desired product is finally located.

Following a successful search using any of these search input mechanisms, a search results screen 206 may be displayed on the customer kiosk. An example search results screen 206 shows a collection of search results based on the input entered by the user via the search input screen 204. In certain implementations, the search results screen 206 can include the names or titles of the product search results 216, the location 218 of the product search results 216, and a collection of buttons 220 that can be used to select a possible search result. In other implementations, the product search results 216 are user-selectable such that information buttons 220 are not necessary. Inactivity for a certain period of time on the search results screen 206 or any other screen may cause a time-out, which may result in a reset back to the start screen 202.

Upon selection of one of the product search results 216 or one of the corresponding buttons 220, the user interface may change to display an item detail screen 208. An example item detail screen 208 shows information related to an item such as the item's price 222, an item identification number such as a universal product code (UPC) 224, an in-store stock-keeping unit (SKU) number, or other item identifiers. In some implementations, an item detail screen 208 may show a more detailed textual description of the item. The detailed textual description may contain, for example, physical dimensions, brand information, recommended age ranges, color options, or other details about the item. In certain implementations, customer reviews or other ranking information pertaining to the item may also be shown on an item detail screen 208. The item detail screen 208 may also show additional product information, such as related products or additional products that are often purchased with the displayed product, for example. In certain implementations, the item detail screen 208 may also show a comparison of the selected product and a comparable product. For example, the selected product may be a national brand item that costs significantly more than a house brand item or a generic item, and the item detail screen 208 may show both of the products together with a message to the customer showing how much she could save by purchasing the house brand item instead. Promotional information 230 may also be displayed on the item detail screen 208. Examples of promotional information 230 may include "buy one, get one free" specials, "buy something, get something" promotions, twenty-five percent off related accessories, the availability of in-store coupons, or the like.

The item detail screen 208 may also show the location 226 and in-stock status of the item. For example, if the item is available in the same store as the customer kiosk, the item detail screen 208 may identify the aisle or row where the item is located. In some implementations, alternative locations 228 for obtaining the item may also be shown. Alternative locations 228 may include, for example, a nearby store or a link to an online retail store.

An example item location screen 210 may show the various purchase locations of an item. In some implementations, a user may select her preferred purchase location via a button 232 displayed on the item location screen. If the item is available in the store, and the in-store purchase option is selected by the user, a detailed location screen 212 may display walking directions from the customer's current location to where the item is located in the store. If the item is not available in the store, but is available in a nearby store, the detailed location screen 212 may display driving directions from the original store to the nearby store, and may also show other relevant details about the nearby store, such as its hours of operation. In certain implementations, the user may choose to place an item "on hold" at the nearby store to ensure its availability when she arrives.

In certain embodiments, the user inputs and corresponding outputs from the user interface screens 200 discussed above are captured and stored by the customer kiosk 104 as a customer navigation history. In various implementations, this stored data may be written to a log file or a database that contains all or a portion of the information related to a particular user's navigation through the screens on the customer kiosk. For example, the log file or database may include the location of the customer kiosk within the store, the type and substance of the user's input, the timing of the user's activity or inactivity (time-out data), the click-through data showing the previous and next screens that were accessed by the user, and the scope of the user's search (in-store, local items, or online). The log file or database may also include all or a portion of the search results and other information corresponding to the search result data, such as the promotional information or detailed product information that was displayed to the user, or the relative proximity of the various search results to the location of the customer kiosk. The log file or database may also include a session identifier that allows the system to distinguish between different user sessions, or even between different item searches performed by the same user.

Figure 3:
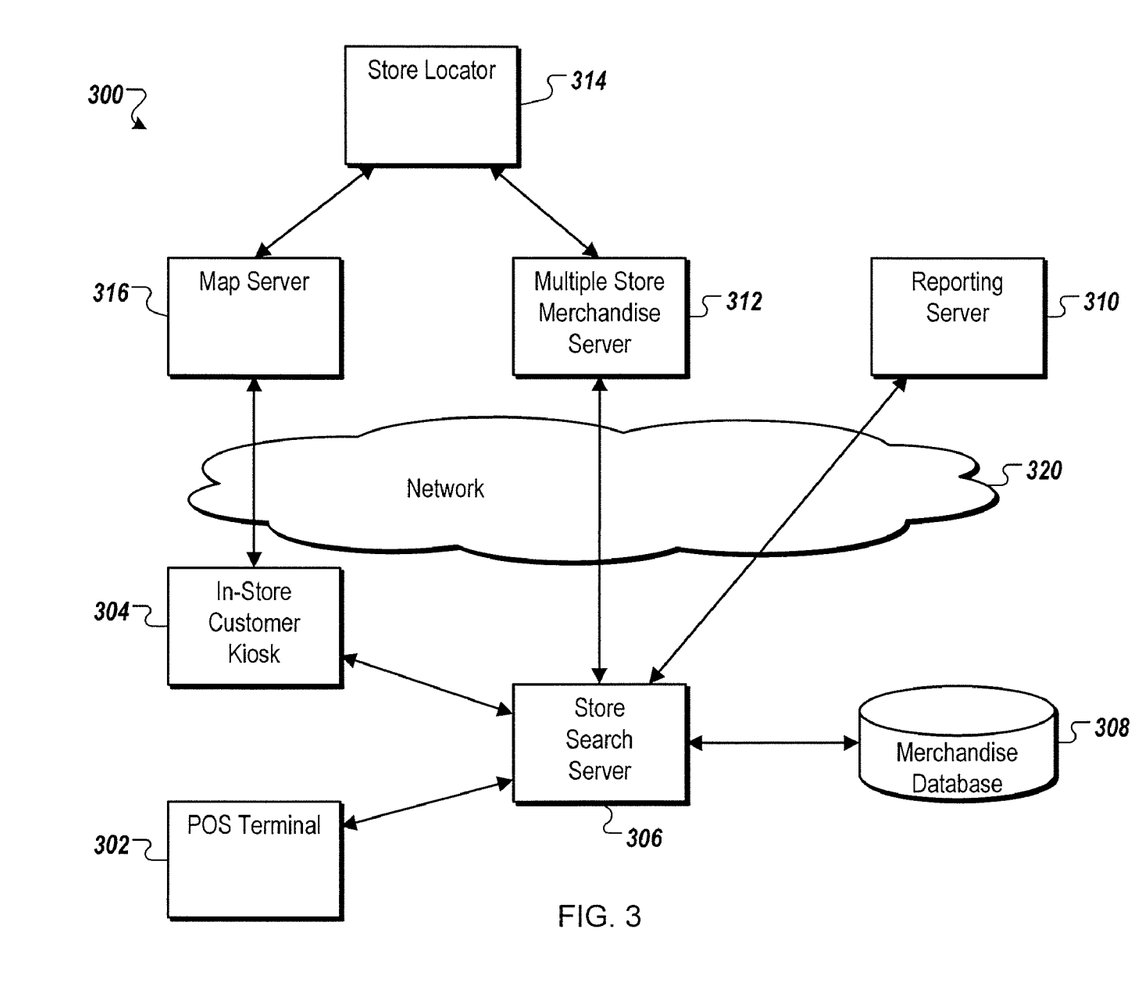
FIG. 3 is a block diagram of a computer network system for implementing an example of a customer search terminal system.

FIG. 3 shows an illustrative block diagram of a computer system 300 that can be used to help a customer find products via an in-store customer kiosk 304, as described above. The system 300 may also be used to determine whether purchases at a point-of-sale (POS) terminal 302 may be attributable to the in-store customer kiosk usage. The system 300 may also be used to maintain up-to-date product information across a distributed commercial retail environment. Other configurations of the network 300 are possible, including fewer, more, or different components. In some implementations, separate components may be integrated together into a single device, and in other implementations, single components may be distributed across multiple devices.

A POS terminal 302, such as a check-out register in a retail store, can be used to sell merchandise to customers. A given retail store may have one or more POS terminals 302. The POS terminals 302 may be configured to record and store certain purchase transaction data, which may also be referred to as product sales data, that will allow the customer kiosk usage information to be correlated with the sales of products during the normal course of business. In certain implementations, the stored purchase transaction data may also be used to further identify customer purchasing trends associated with the customer kiosk usage. For example, the stored transaction data may include a time stamp to indicate when a product or products were purchased. The transaction data may also include information about all or a portion of the items purchased in the same transaction by a customer, including information such as the entire purchase price of the transaction, the number of different items sold, the quantities of various items sold, the product groups of the items sold, and the like.

An in-store customer kiosk 304 may be configured to receive customer search inputs and to identify and locate items related to the customer searches. The in-store customer kiosk 304 may also be configured to store customer usage information as discussed above.

A store search server 306 can create a search strategy, for example a Structured Query Language (SQL) query or other similar machine search instruction, based on the information entered on the in-store customer kiosk 304. For example, the store search server 306 may be configured to intelligently adapt to different types of customer searches by appropriately adjusting the Boolean phrases used with certain types of customer searches. In turn, the store search server 306 is further configured to search a merchandise database 308 to determine if any items available in the store match the input from the in-store customer kiosk 304 searches.

The store search server 306 may also communicate with a multiple store merchandise server 312 via a shared network 320, such as a LAN or the Internet, to determine if an item is located in another store or is available via an online retail environment. Item information in the merchandise database 308 or a database on the multiple store merchandise server 312 may include, for example, pricing information, location information, stock quantity information, and availability information. The item information may also include an indicator of whether the particular item qualifies for a certain status such as tax-free or FSA-eligible. In some implementations, the multiple store merchandise server 312 may provide periodic or batch updates to item entries in the merchandise database 308. Examples of these updates may include, for example, a change in the item's price, availability, color options, or new promotions related to the item. In such implementations, updates to item information in a distributed retail environment may be simplified because the administrators of the system only need to update a single information source when modifying a particular item.

In some situations, a desired item may be available in one or more physical store locations. A store locator 314 can locate which stores and how many stores that have the item should be shown to the customer on the in-store customer kiosk 304. A map server 316 may be used to generate maps that provide directions from the customer's current location to other locations identified by the store locator 314. In some implementations, the maps may be sent to a webpage server to be displayed as a component of a web page. In some implementations, the maps may be sent to the in-store customer kiosk 304 to be displayed.

In some situations, the desired item may be available for purchase through the store's online retail website. A webpage server can display the item's web page to a customer on the in-store customer kiosk 304. In some implementations, the item can be purchased directly from a website via the customer kiosk 304, and shipped, for example, to the customer's home.

A reporting server 310 may also be included to generate reports that contain information about the system usage or the estimated efficacy of the in-store customer kiosks 304. Information relating to the customer kiosk usage data and product sales data, both of which are described above, may be collected from sources including the in-store customer kiosk 304, the store search server 306, and the POS terminal 302.

In some implementations, the reporting server 310 may include a receiving module that is configured to passively receive or actively gather customer usage data from one or more in-store customer kiosks 304. For example, in a passive implementation, the receiving module may wait until the customer usage data is sent to the reporting server or is otherwise imported to the reporting server 310. This implementation may allow the customer usage data to be imported only when a predetermined amount of relevant data has been received by the in-store customer kiosk 304, which may occur intermittently. For example, the customer kiosk may send customer usage information when the memory on the customer kiosk 304 has reached a certain percentage of its capacity. This may occur every few hours or may not occur for a few days, depending on the in-store traffic, the day of the week, and other usage variables. The customer kiosk 304 may also be configured to send customer usage data on a schedule, such as every day. In a more active implementation, the receiving module may be configured to actively query one or more customer kiosks 304 using any of a number of known techniques. The reporting server 310 may also include a receiving module that passively receives or actively gathers product sales data from one or more POS terminals 302.

The reporting server 310 may also include a correlation module configured to analyze and correlate the received customer usage data and the received product sales data. The reporting server 310 may also be configured to generate reports based on its analysis and correlation of the received data. The analysis and correlation of the received data is described in greater detail below.

Figure 4:
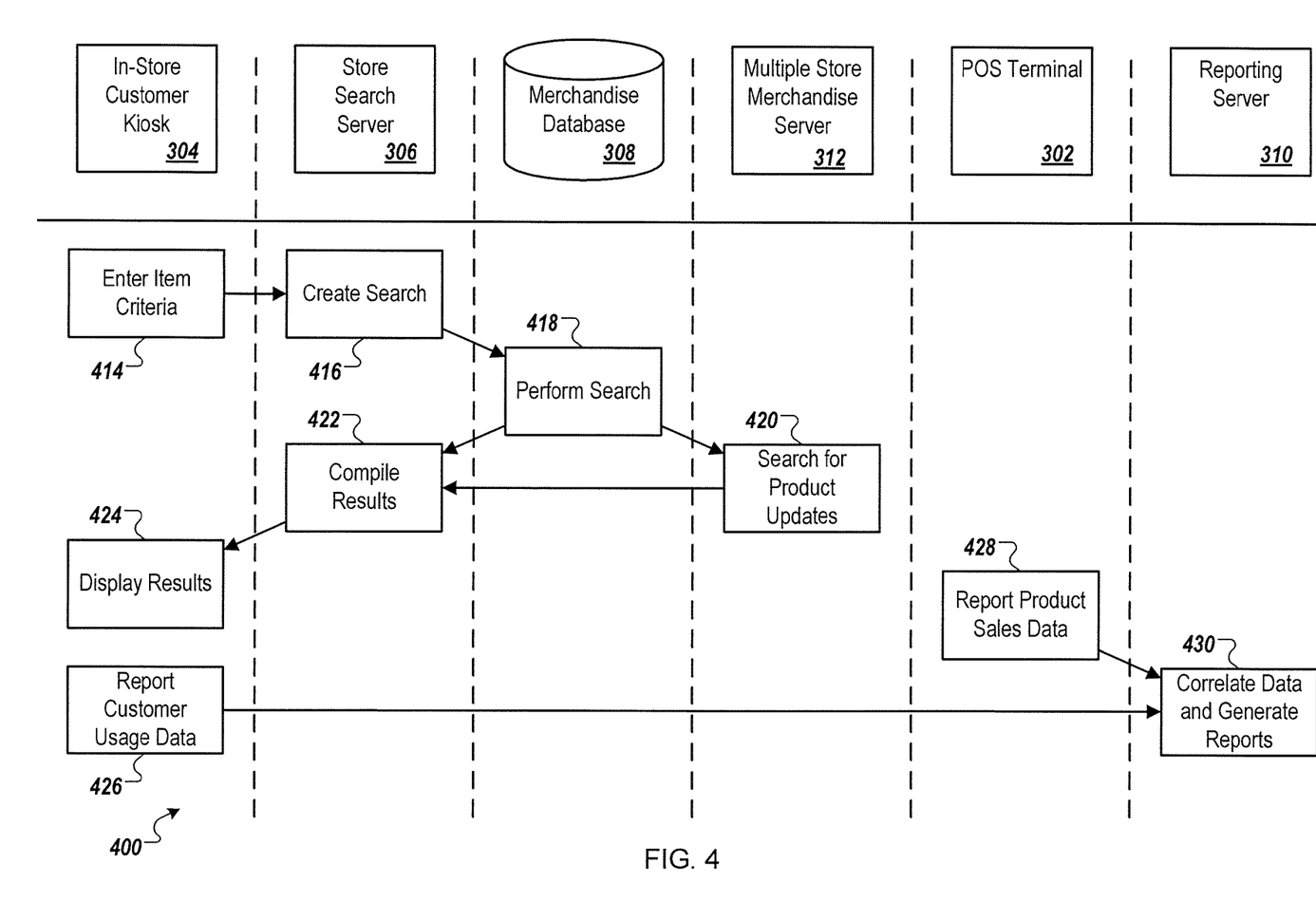
FIG. 4 is a swim lane diagram of illustrative processes for searching and reporting.

FIG. 4 shows an example swim lane diagram of a process 400 for generating and displaying search results on an in-store customer kiosk 304. The example swim lane diagram also shows a process for generating correlated kiosk usage reports on a reporting server 310. Each swim lane shows processes that may be performed by, for example, a component such as that shown at the top of the swim lane.

Item search criteria can be entered 414 on a component such as the in-store customer kiosk 304. For example, a user can input a keyword, a price range, or a barcode as described above. This item search information can be related to a particular item or a type of item the user wishes to locate and purchase.

A product search may then be created 416 on a component such as the store search server 306. In some implementations, this can include, for example, the creation of a search query (SQL) command, the determination of which resources to search, or the examination of cached data.

Following the creation of a product search, the search may be performed 418 on a component such as a merchandise database 308. In some implementations, a database can execute a search command to locate entries that match a given set of criteria. For example, if the search specifies a keyword "wrench" and a price range of $4.00 to $20.00, then a collection of wrenches, sockets, nuts, and bolts that have a price in the specified range can be found within the database.

A multiple store merchandise server 312 may be used to perform product update searches 420 to ensure that the merchandise database 308 contains the most up-to-date information about the products that are identified in the results of the product search 418. In some implementations, a search may be performed to find pertinent and up-to-date data about the results of a particular search. For example, the multiple store merchandise server 312 may determine the inventory location and count of the searched items, directions to a store that has the items in stock, promotional information related to the searched items, the availability date for when an item goes on sale, or other related information. In some implementations, this may also include information about purchasing the product online or from another store location.

The result of the item search and product updates can be compiled 422 on a component such as the store search server 306. In some implementations, the items can be ranked according to price, availability, past sales performance, user ratings, location, or the like.

The compiled results can then be displayed 424 by a component such as the in-store customer kiosk 304. In some implementations, the results can be read by a user who may wish to sort them, search with narrower or broader criteria, or find the location of the desired item.

Customer usage reports 426 and product sales reports 428 can be generated and reported by components such as the in-store customer kiosks 304 and the POS terminals 302, respectively. In some implementations, the reported data may contain various pieces of information about kiosk searches and potentially corresponding product sales that are made within a specific period of time. These reports can be analyzed and correlated on a component such as the reporting server 310, which may further be used to generate reports 430 that reflect the correlation of the customer usage reports and product sales reports.

In one example of the correlation process, a customer usage report may show that a socket wrench was searched for via an in-store customer kiosk 304, and that the socket wrench and an in-store promotion for a related socket set was shown to the customer at 2:38 pm. A product sales report may show that the socket wrench and related socket set were sold at a POS terminal 302 in the same store just fourteen minutes later at 2:52 pm. Depending on the settings of the reporting server 310, the sale of the socket wrench and socket set may be correlated as being potentially attributable to the customer usage of the in-store customer kiosk 304.

Alternatively, the customer usage report may show the same socket wrench and related socket set promotion, but the report may also show that the customer had been advised that the items were not available in the store. The customer usage report in that circumstance may show that the customer was referred to a store approximately 10 miles away in a nearby town. In such a circumstance, a similar correlation may still be found, assuming a POS terminal 302 in the nearby store showed a sale of the socket wrench and socket set about 45 minutes later at 3:23 pm.

In another example implementation, a user may swipe a customer loyalty card before searching for the socket wrench. When the socket wrench is then sold in a transaction associated with that particular loyalty card, the search and sale can be correlated. Each of these types of correlations may be very useful to a business in undertaking a cost-benefit analysis to determine whether to roll out additional customer kiosks in a particular store or in other locations.

Figure 5:
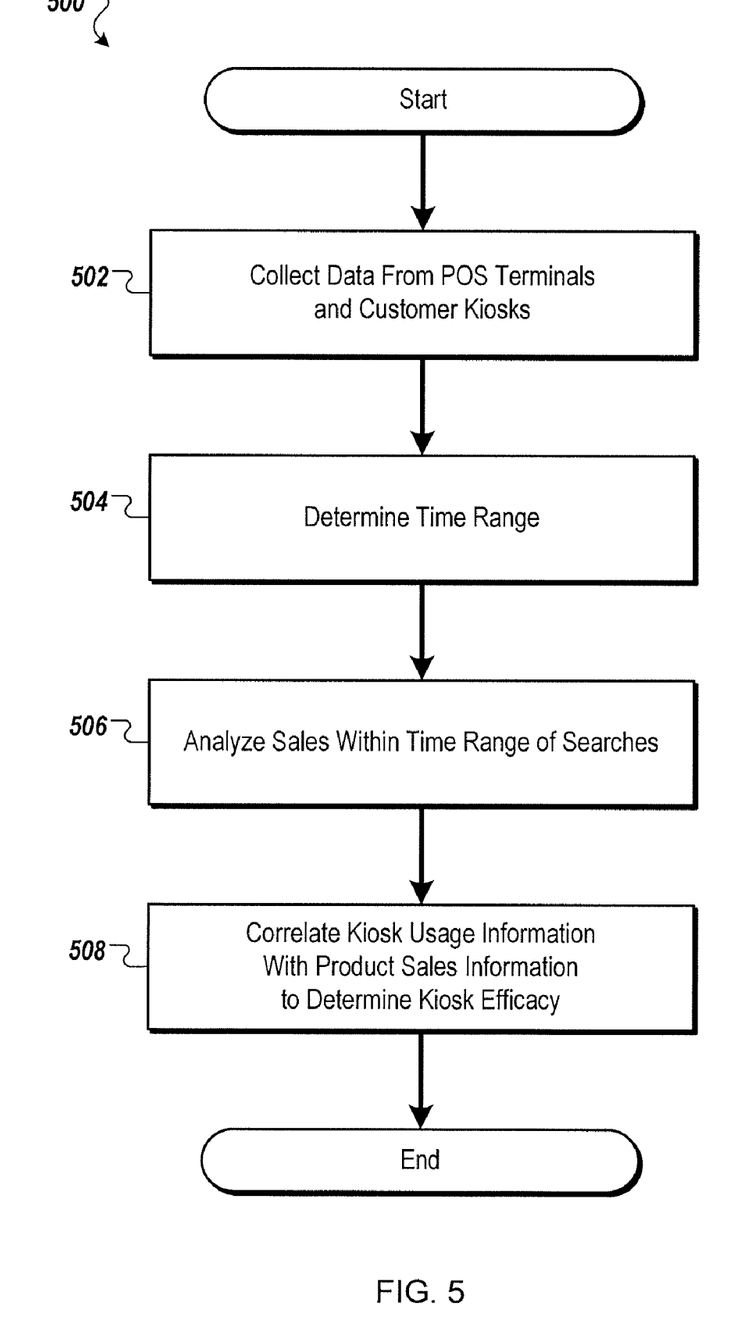
FIG. 5 is a flow chart of an example process for correlating search data with sales data.

FIG. 5 shows an illustrative flow chart of a process 500 for correlating product sales data with customer usage data. Data may be collected from POS terminals and customer kiosks at step 502. This data may include searches for products conducted on a kiosk, sales transacted by a POS terminal, and the locations of the POS terminals, kiosks, or products, for example.

A time range can be determined at step 504. In some implementations, the sale of an item may be matched with a customer search that returns the particular item if the sale was made within a specified time range relative to the customer search. In some implementations, this time range is variable and user-definable. In other implementations, the time range may be held constant. In one example, it may be determined that sales of an item within thirty minutes of a search displaying that item may be attributed to the customer search. In another implementation, a progressive set of time ranges may be defined. These progressive time ranges are meant to correspond to the varying likelihoods that the sales of an item made within each respective time range corresponds to purchases that were influenced by a customer's usage of the customer kiosk. For example, the associated likelihood of a correlation could be:
  i. Sale 0-5 minutes after search: 15%
  ii. Sale 6-10 minutes after search: 45%
  iii. Sale 11-55 minutes after search: 33%
  iv. Sale 56-120 minutes after search: 10%

In some examples, these values may be adjusted based on the item, the store, the location of the item, or other factors.

Sales within a specified time range of a search can be analyzed at step 506. In some implementations, information about factors including the searches and the sales may also be analyzed. For example, when a collection of similarly grouped items were purchased in a single transaction by a potential user of the in-store customer kiosk, those other purchases may also be identified as possibly having been attributable to the customer's usage of the customer kiosk. In another example, related searches that may have led to indirect sales of an item may also be included in the set of potentially kiosk-influenced sales. In this example, a user may not have found the exact item that he or she was seeking, perhaps a ⅛" crescent wrench, but the user may have been guided to the hardware department and found a similar tool that was suitable for the customer's purpose.

The efficacy of the customer kiosks may then be determined at step 508. In some implementations, the efficacy relates to the financial impact of the kiosks. For example, sales information for a product in a store can be compared to sales rates for that product that are likely the result of a search. Using this information, the expected income generated by a particular kiosk or group of kiosks can be determined. This income can be compared to the cost of installing and operating the kiosk to determine if the kiosk represents a net gain or loss to the store. In another implementation, a kiosk's effect on sales can be used to determine if a change in sales rate is likely. This information can be used in some implementations to suggest changes in the store's inventory management, sales promotions, or advertising.

In some implementations, a specific user may be personally identified when using a customer kiosk. For example, a user can enter a username and password, swipe a credit card or loyalty card, or provide credentials when checking out a PDA type device from the store. Purchases from these users can be directly correlated to the user if the same identification is made by the customer at a POS check-out terminal. For example, a user can log in to a kiosk by swiping her credit card. As describe above, this may identify the specific user to the system, and the system may in turn present a tailored or personalized user interface for the specific user. The user's personal information, which can include past searches, purchase information, and FSA information, for example, can also be used to generate targeted advertisements specific to the user. If the user later purchases one or more of the items searched for with a credit card that is associated with the user's personal information, a more direct correlation may be assumed by the system.

Figure 6:
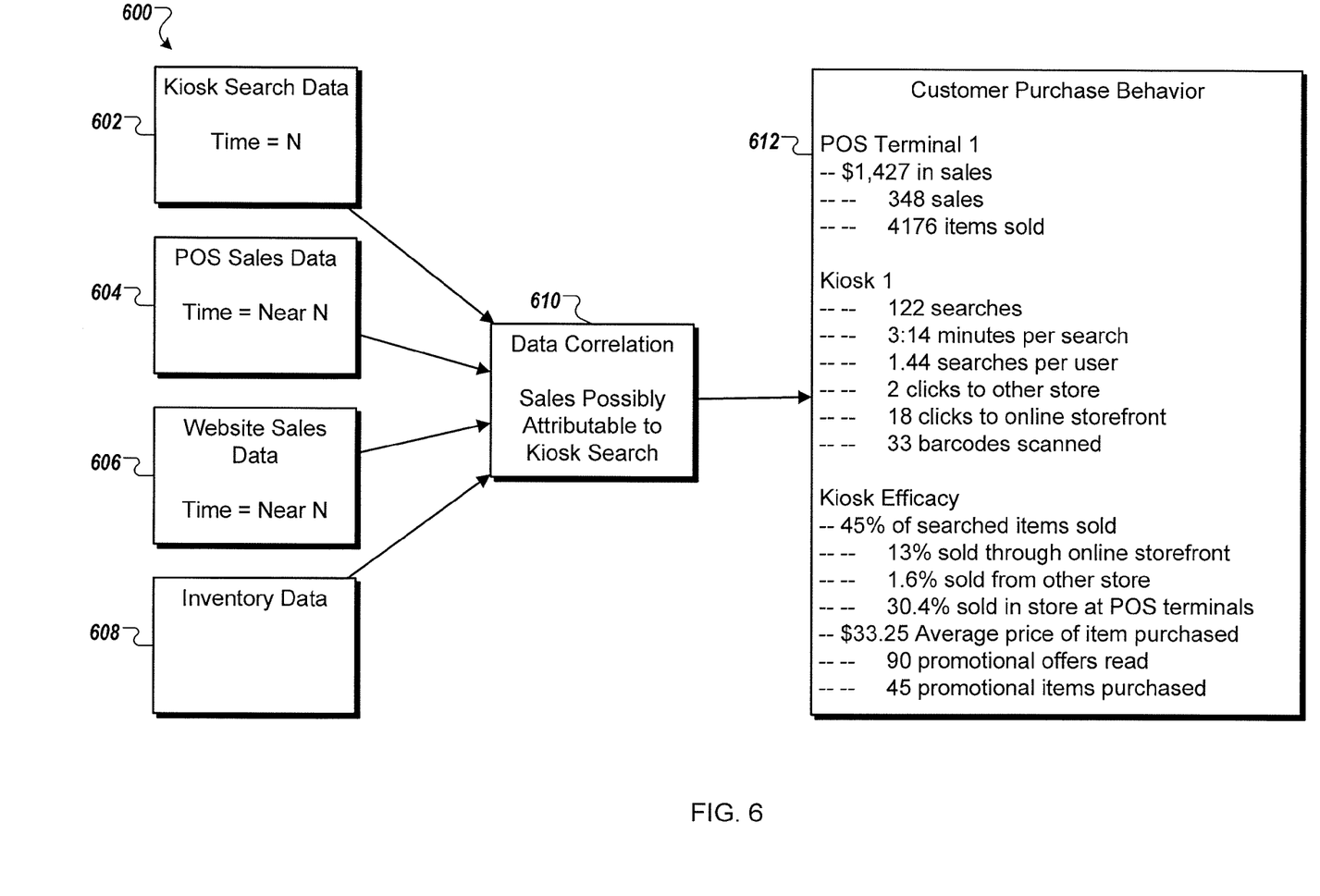
FIG. 6 is a block diagram of an illustrative data correlation system.

FIG. 6 shows an example of a block diagram 600 showing the types of data that can be gathered and correlated in a customer kiosk system. Search data from a customer kiosk 602 can be identified as occurring at a certain time. In some implementations, this can include a collection of all searches within a particular time window. In other implementations, this may include identifying the times that one or more specific searches take place, such as the times when searches for a specific keyword are executed.

POS sales data 604 can also be identified as occurring at a certain time. In some implementations, the only POS sales data 604 queried by the system are the sales transactions that include items that were displayed as a search result on a customer kiosk within a given time period before the sales transaction. By only querying a smaller subset of the larger volume of POS sales data 604, system resources may be conserved.

Website sales data 606 can also be identified as occurring at a certain time. In some implementations, website sales can be transacted directly using the input and output of the customer kiosk, and these transactions can be tracked and stored. In another implementation, the geo-location and time of website sales may be used to identify website sales that occur near a certain time and place. For example, a sale may have been made by a user at home after she searched for an item at an in-store customer kiosk and found that the color she wanted was only available online.

Inventory data 608 can also be identified. In some implementations, this data can include searched items that are in stock, and items that were or were not in the same store as a kiosk that executes a search for that item. In some implementations the inventory data 608 can also include information associated with a user that may have searched for a particular item.

A data correlation module 610 can analyze the data 602, 604, 606, and 608 and determine the sales that may have been attributable to a customer kiosk search. In some implementations, the data correlation module 610 can include one or more software processes executing on one or more computing devices, such as servers that can be located in disparate locations. In other implementations, the data correlation module may be executed on a single machine running in the same location as a customer kiosk or point-of-sale terminal.

The data correlation module 610 can generate customer purchase behavior reports 612. In some implementations, the purchase behavior reports 612 can show information relating to sales from one or more POS terminals, websites, or other store locations. In some implementations, the customer purchase behavior reports 612 can report information related to one or more customer kiosks. In some implementations, the customer purchase behavior reports 612 may show the search and purchase behavior of one or more users, or a group of similarly situated users. For example, reports 612 may be generated to identify the customer kiosk usage and potentially related purchases for customers who spend more than $75 in a single transaction.

An example customer purchase behavior report 612 can show information related to sales from the POS terminals before and after kiosks are installed in a store, and how the sales are affect by the introduction of the kiosks. In another example, the customer purchase behavior reports 612 can show sales from stores that do not have customer kiosks, and these reports can be compared to sales in stores that do have kiosks. In another example, the purchase behavior reports 612 can show changes in the types of items sold in a store after one or more customer kiosks are installed. In another example, the purchase behavior reports 612 can show sales made on a website through the customer kiosks, and these sales can be credited to the store where the kiosk is located for purposes of sales reporting.

A number of implementations have been described. Nevertheless, it will be understood that various modifications may be made without departing from the spirit and scope of the systems and methods described herein. For example, many of the processes are described as being performed as batch operations, but other implementations may allow the operations to occur in real time. Similarly, the steps of various procedures are described as occurring in a certain order, but many of the steps may occur either simultaneously or in a different order than described. Accordingly, other embodiments are within the scope of the following claims.

What is claimed is:

1. A computer-implemented method for determining the efficacy of a customer search terminal system that accepts customer product searches and identifies corresponding products and product information, the method comprising:
    providing an in-store customer search terminal as a fixture in a retail establishment in a location accessible by a customer, the customer search terminal storing a database of inventory available at the retail establishment;
    a reporting server receiving, at a computer, customer search terminal usage information including data related to customer usage of the customer search terminal;
    the reporting server receiving product sales information including data related to products sold at an in-store point-of-sale terminal; and
    generating customer purchase behavior information by correlating the received customer search terminal usage information with the received product sales information from the point-of-sale terminal, the step of correlating comprising determining sales of said corresponding products that occurred within a prescribed time period relative to the respective searches for the corresponding products on the customer search terminal, wherein the data related to customer usage includes search terms entered into a user interface of the customer search terminal and corresponding product search results displayed on the customer search terminal, wherein the data related to the customer usage further includes a customer navigation history that includes customer inputs to the customer search terminal and information about screens that are displayed on the customer search terminal during a customer search session, and wherein the customer navigation history further includes timing information related to how long each of the screens is displayed.

2. The method of claim 1, wherein the data related to customer usage further includes promotional data related to products identified in the product search results.

3. The method of claim 1, wherein the data related to customer usage further includes the proximity of the customer search terminal to products identified in the product search results.

4. The method of claim 1, wherein the data related to products sold includes information about the items purchased by a customer in a single transaction.

5. The method of claim 4, wherein the data related to products sold includes the total price of the items purchased by the customer in the single transaction.

6. The method of claim 1, further comprising generating a report based on the customer purchase behavior information related to one or more customer search terminals.

7. A system for determining the efficacy of a customer search terminal system that accepts customer product searches and identifies corresponding products and product information, the system comprising:
   a customer search terminal provided as a fixture in a retail establishment, the customer search terminal storing a database of inventory available at the retail establishment; a receiving module configured to receive customer search terminal usage information including data related to customer usage of the customer search terminal;
   a receiving module configured to receive product sales information including data related to products sold at a point-of-sale terminal; and
   a correlation module configured to generate customer purchase behavior information by correlating the received customer search terminal usage information with the received product sales information from the point-of-sale terminal, the correlation module determining sales of said corresponding products that occurred within a prescribed time period relative to the respective searches for the corresponding products on the customer search terminal, wherein the data related to customer usage includes search terms entered into a user interface of the customer search terminal and
   corresponding product search results displayed on the customer search terminal, wherein the data related to customer usage further includes a customer navigation history that includes customer inputs to the customer search terminal and information about screens that are displayed on the customer search terminal during a customer search session,
   wherein the customer navigation history further includes timing information related to how long each of the screens are displayed.

8. The system of claim 7, wherein the data related to customer usage further includes promotional data related to products identified in the product search results.

9. The system of claim 7, wherein the data related to customer usage further includes the proximity of the customer search terminal to products identified in the product search results.

10. The system of claim 7, wherein the data related to products sold includes information about the items purchased by a customer in a single transaction.

11. The system of claim 10, wherein the data related to products sold includes the total price of the items purchased by the customer in the single transaction.

12. The system of claim 7, wherein the customer search terminal and the point-of-sale terminal are located in different stores.

13. The system of claim 7, further comprising a report generation module configured to generate a report based on the customer purchase behavior information related to one or more customer search terminals.

* * * * *